United States Patent [19]

Sterling

[11] 4,042,099
[45] Aug. 16, 1977

[54] AIR CONTROLLED SWITCH

[75] Inventor: Walter S. Sterling, Quincy, Mass.

[73] Assignee: Pneumatic Scale Corporation, Quincy, Mass.

[21] Appl. No.: 613,028

[22] Filed: Sept. 12, 1975

[51] Int. Cl.² .................. B65G 47/14; B65G 43/08; B65G 53/00
[52] U.S. Cl. .................. 198/393; 198/493; 198/524; 198/857; 302/2 R
[58] Field of Search .............. 302/2 R, 11, 12, 13; 141/141, 159, 161, 140; 198/21, 37, 232, 287, 393, 469, 524, 857, 493; 271/260

[56] References Cited
U.S. PATENT DOCUMENTS

| 2,252,498 | 8/1941 | Flaws | 198/857 X |
| 2,749,109 | 6/1956 | Maud | 302/2 R X |
| 2,985,338 | 5/1961 | Everett | 221/9 |
| 3,160,443 | 12/1964 | Harris et al. | 302/2 R |
| 3,164,291 | 1/1965 | Sterling | 221/10 |
| 3,382,010 | 5/1968 | Wilkinson | 302/2 R |
| 3,590,182 | 6/1971 | Beckhardt et al. | 302/2 R X |

Primary Examiner—Evon C. Blunk
Assistant Examiner—James L. Rowland
Attorney, Agent, or Firm—Dike, Bronstein, Roberts, Cushman & Pfund

[57] ABSTRACT

In an apparatus for processing items wherein there is a rotatable sorting table for orienting items and delivering the properly oriented items to a discharge passage, and an air jet for driving the items along the discharge passage, a pressure responsive device operable by blocking of the air jet to stop rotation of the sorting table.

13 Claims, 5 Drawing Figures

AIR CONTROLLED SWITCH

BACKGROUND OF INVENTION

It is common in the art to control the delivery of items from a bulk supply by providing a switch which is operated by an excess of such items at a given place in the processing of the items to stop delivery and when the excess has dissipated to restore delivery. In the Sterling U.S. Pat. Nos. 3,164,291 and 3,164,292 and the Everett U.S. Pat. No. 2,985,338 a counterweighted plate is employed over which items are moved which is operable if an excess of items depresses it to stop delivery of the items until the excess items have been removed. It is also known in the art of processing items to effect their movement from one place to another during processing by air jets placed to drive the items along a narrow passage. This invention is designed to take advantage of the use of such a driving jet and the accumulation of an excess number of items to control the delivery of items from the bulk supply.

SUMMARY OF INVENTION

Apparatus embodying a passage along which items are moved in a continuous stream by jet propulsion provided by a jet disposed at an angle to the passage such as to direct the jet of air in a direction to advance the items along the passage, a bulk supply of items, means for processing the items delivered thereto from the bulk supply and delivering them to the passage and control means operable in the event the jet is blocked by a standing stream of items in the passage to discontinue the supply of items by stopping the means for processing the items. The means for processing the items is an inclined rotatable sorting table driven by a motor and including a clutch in the drive from the motor to the table. The control means comprises an actuator supported at the opposite side of the passage from the jet in a position to be held inoperable by the intermittent blasts of air from the jet as successive items pass and to be operable when the blast from the jet is totally deflected by a standing line of items to effect operation of pneumatic means which in turn operates to disengage the clutch or stop the motor. The pneumatic means comprises a nozzle having a metering orifice through which air escapes at a predetermined rate, a closure supported adjacent the orifice of the nozzle which is normally held away from the orifice by the flow of air therefrom but which can be moved to a closed position to stop the flow of air, an actuator which is operative at times in conjunction with the closure to close the orifice and an air cylinder operative by the increase of pressure developed in the chamber when the orifice is closed to effect disengagement of the clutch or stop the motor. The closure is a flexible spring biased blade supported opposite the orifice and the actuator is a correspondingly flexible spring biased flat plate supported substantially parallel to the closure blade with its free end situated in the path of the jet which drives the items along the passage with a portion intermediate its ends in engagement with a pin for transmitting its force when undeflected by the jet to the closure blade.

The invention will now be described in greater detail with reference to the accompanying drawings, wherein.

Figure 1:
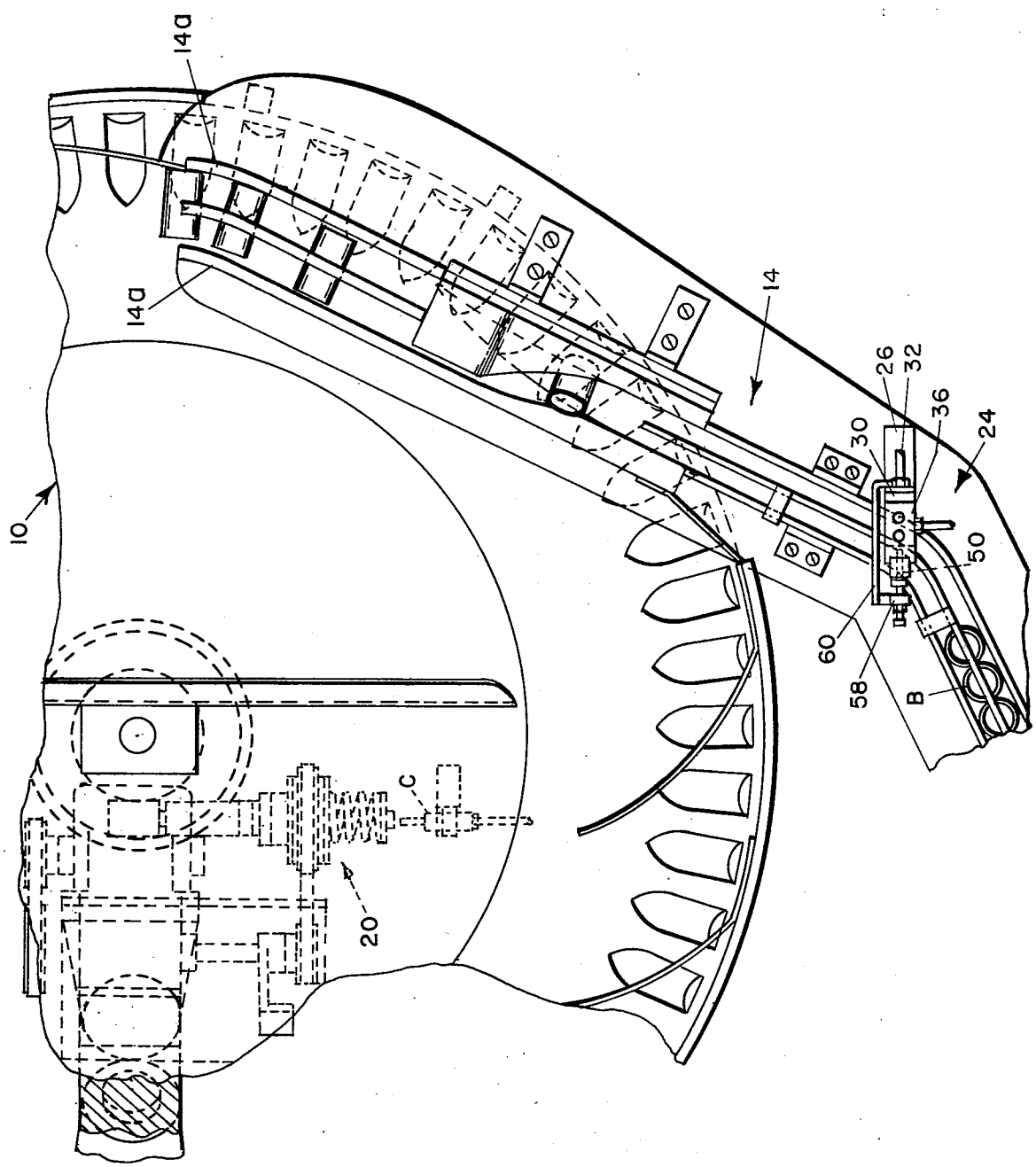
FIG. 1 is a fragmentary plan view of an article handling apparatus provided with an air control switch according to this invention.
Figure 2:
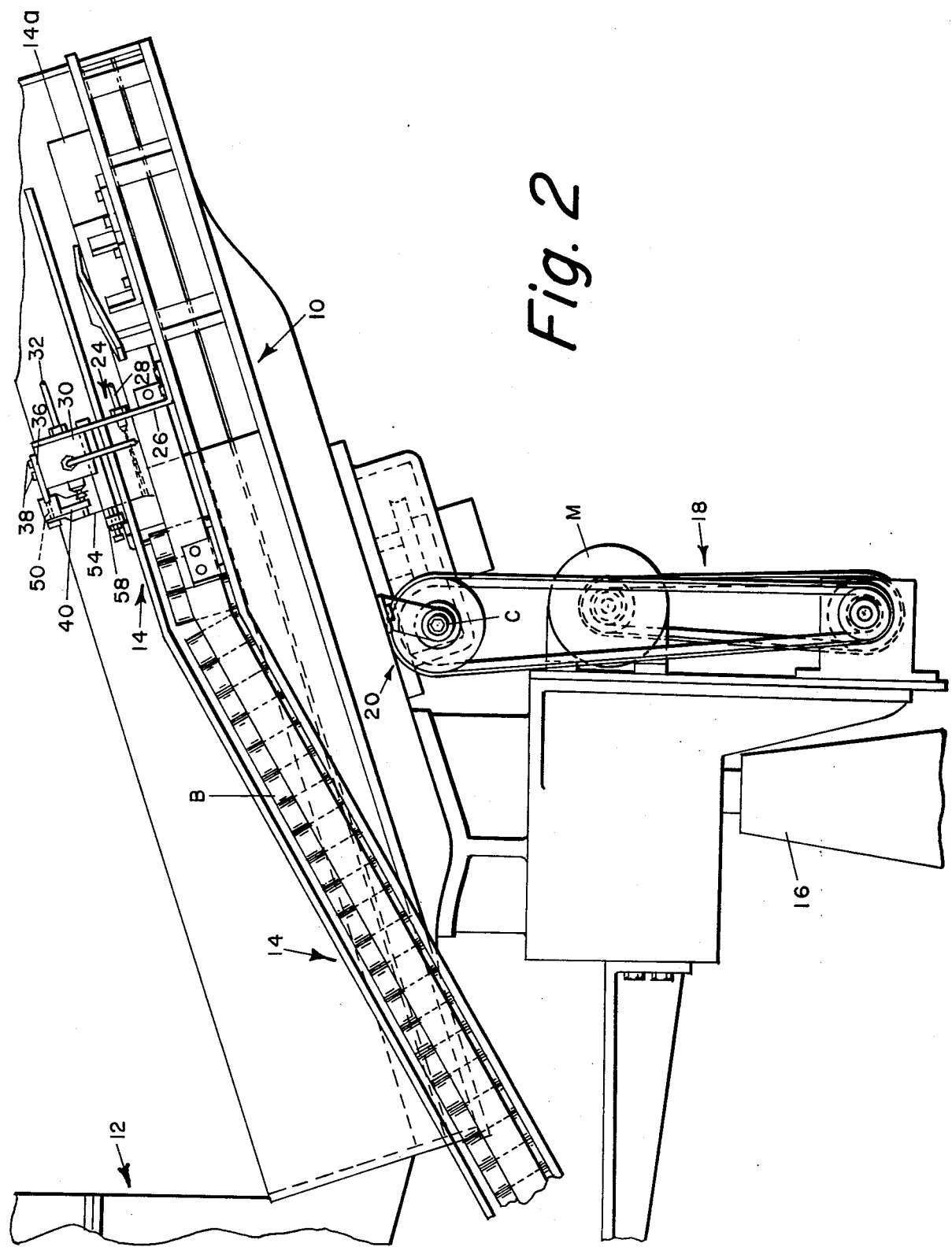
FIG. 2 is a fragmentary elevation of the apparatus shown in FIG. 1, showing means for supplying articles to the apparatus.
Figure 4:
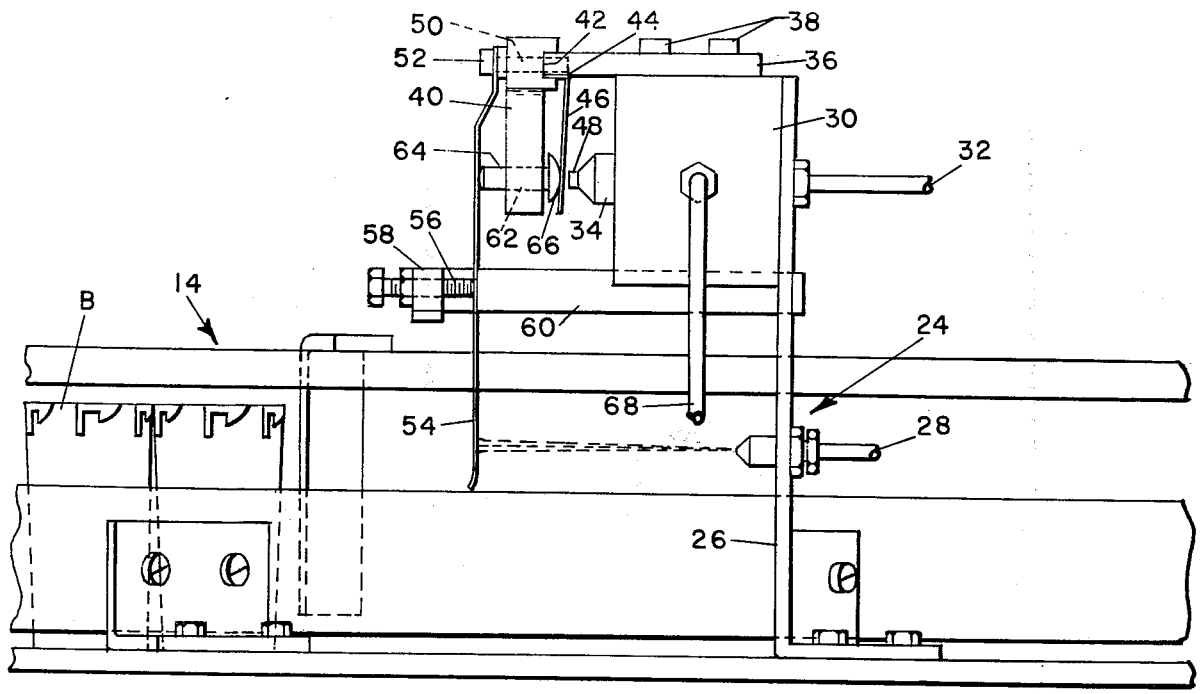
Figure 5:
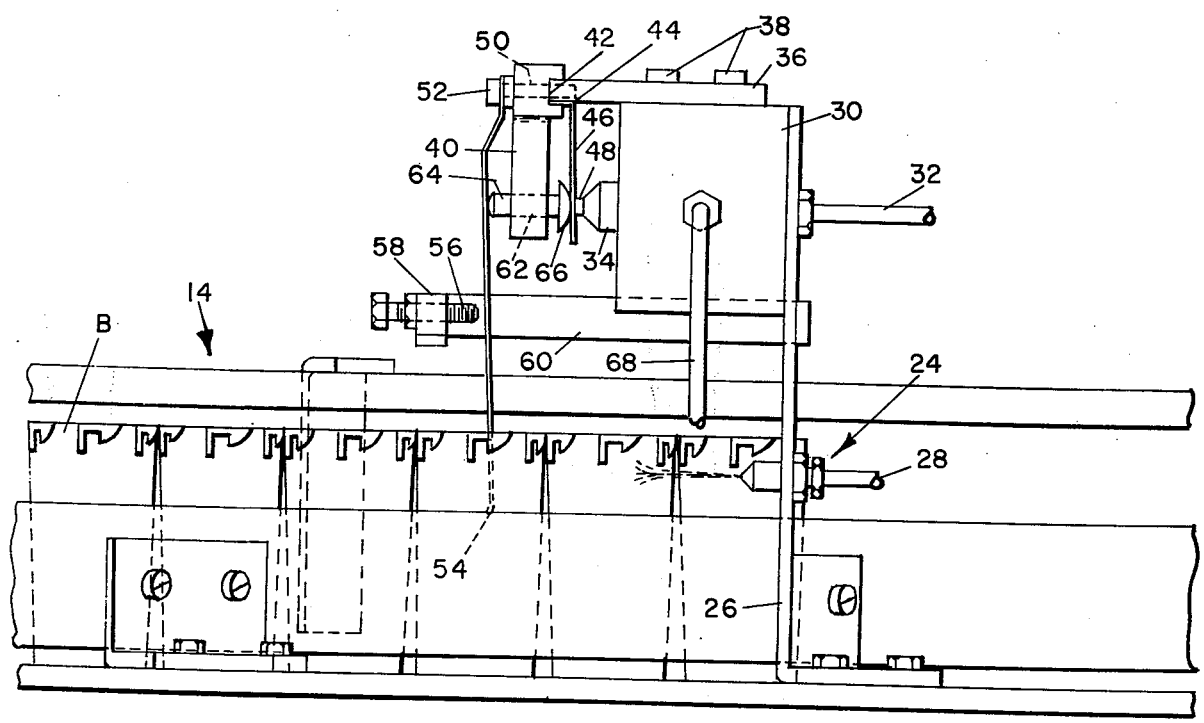

FIG. 4 is an enlarged view taken transversely of the track along which the articles processed by the apparatus of FIGS. 1 and 2 travel from the apparatus to a place of discharge showing the position of the air switch when the articles are travelling at a normal rate of discharge, and FIG. 5 is a view corresponding to FIG. 4 showing the operation of the air switch when the articles have become stalled.

Figure 3:
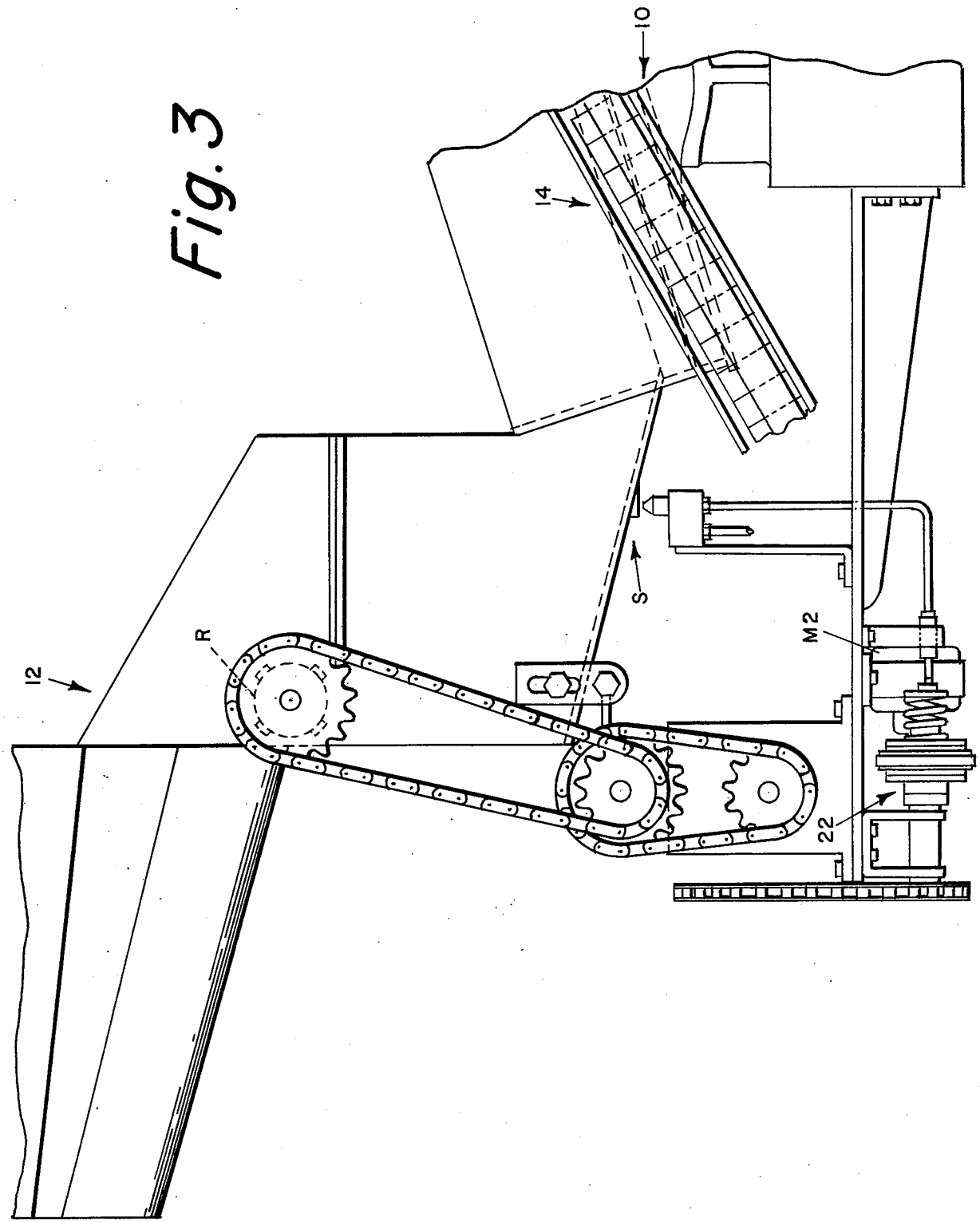
FIG. 3 is an elevation of the means for supplying articles to the apparatus.

This invention is concerned with improved means for stopping the delivery of articles from processing apparatus when the discharge of the processed articles through the passage provided for some reason becomes jammed. The processing apparatus as herein illustrated is of the kind, as shown in FIGS. 1, 2 and 3 wherein an inclined circular table 10 is supported for rotation relative to a hopper 12 which is designed to supply a quantity of the articles which are to be processed to the lower side of the table, the latter operating by its rotation to carry the articles upwardly in the direction of rotation and during such movement to select the articles reposing in a predetermined position for discharge through a track 14 and to return those not so oriented to the bottom where they are again cycled for delivery to the discharge track according to whether they are properly oriented when they reach the top of the table. The table is supported on a pedestal 16 which also supports a motor M and driving means 18, including a clutch 20 which is operable to be engaged to effect rotation of the table and to be disengaged to stop rotation of the table. The hopper 12 is provided with a rotor arranged to control the delivery of items to be processed to the lower edge of the table, FIG. 3. A motor M2 is provided for driving the rotor and there is a clutch 22 in the drive which is operable to at times drive the rotor and at times to stop the rotor. A sensor S responsive to an accumulation of articles at the lower end of the table operates to disengage the clutch 22 when the number of articles becomes excessive and to re-engage the clutch when the number of articles is depleted so as to maintain a substantially uniform quantity of articles at the lower end of the table for efficient operation.

Apparatus of this kind is well known in the art as shown, for example, in U.S. Pat. Nos. 3,164,291 and 3,164,292 and hence a more detailed description of the operation and selecting devices employed to obtain the desired orientation of the articles being processed is not required.

In the normal operation of the apparatus the articles are delivered at the upper end of the inclined table 10 to the discharge track 14 between guides 14<sup>a</sup>—14<sup>a</sup> and travel downwardly along this track toward a place of discharge. It is conventional to provide air jets along the discharge track to hasten the discharge and one such jet 24 is shown in FIGS. 1, 4 and 5, disposed at an angle to the track 14 so as to direct a blast of air transversely across the track to thereby impinge upon the rear sides of articles travelling along the track and push them forwardly toward the discharge end of the track. The jet 24 as shown in FIGS. 4 and 5 is supported by an angle bracket 26 bolted to the track in a substantially horizontal position and at a level to project a jet of air against the articles, which herein illustrated are small bottles B. The jet is supplied with air pressure through a conductor 28. As thus arranged the jet of air issuing from the nozzle 24 will, when the bottles are travelling along at a normal rate, pass between adjacent bottles at intervals corresponding to the rate of travel of the bottles. This is taken advantage of according to this invention the effect operation of a pneumatic means which in turn controls the delivery of articles, that is bottles, from the sorting table 10 so that if the line of bottles becomes stalled rotation of the sorting table will be stopped so that no additional bottles will be delivered to the track 14. The pneumatic means comprises a block 30 mounted to the upper end of the bracket 26 containing a chamber to which air is supplied under pressure through a conductor 32. A nozzle 34 provided with a metering orifice 48 is fixed in an opening in communication with the chamber through which air from the chamber flows at a predetermined pressure. A plate 36 is fastened by bolts 38 to the top of the block 30 so as to extend forwardly from the face of the block from which the nozzle 34 extends transversely of the track 14 and at the distal end of the plate 36 there is mounted a hanger 40 which extends downwardly from the plate 36 below the nozzle 34. The hanger 40 contains a groove 42 which fits over the edge of the plate 36. The groove 42 is slightly wider than the thickness of the plate 36 so as to receive the bent end 44 of a flat spring finger 46 which extends downwardly at the inner side of the hanger 40 between it and the nozzle so as to close the orifice in the nozzle when held against the orifice. The spring finger 46 is clamped together with the hanger plate to the plate 36 by a screw bolt 50 having a knurled head 52. The spring finger 46 is pre-stressed in a direction to close the orifice, however, the stressing is not sufficient to completely block the flow of air through the nozzle so that the pressure in the chamber is lower than the source pressure. There is also mounted on the plate 36 by means of the bolt 50 a spring finger 54 which extends downwardly to a position such that its lower end is somewhat below the level of the jet of air projected from the nozzle 24. As thus positioned during normal flow of the containers along the track the jet of air from the nozzle 24 will impinge upon the lower end of the finger 54 each time a container passes the jet and sufficiently often to hold the finger 54 displaced to the left as shown in FIG. 4 in engagement with a limit screw 56 adjustably supported in a bar 58, supported by a bracket 60 which in turn is supported by the bracket 26. The spring finger 54 is biased toward the nozzle 34, that is, in a direction away from the limit pin 56. When the normal flow of containers is stopped and the air jet from the nozzle 24 is thus deflected so as not to impinge upon the spring finger 54 the latter moves away from the limit screw 58 to the right as shown in FIG. 5. At the lower end of the hanger 40 there is mounted within a hole 62 a pin 64, one end of which is opposite the spring finger 54 and the other end of which has on it a head 66 which lies opposite the spring finger 46. The pin 64 is loosely mounted in the hole 62 so as to be free to move horizontally therein toward or away from the nozzle 34 and to be moved by the spring finger 54 when the latter is not acted upon by the jet from the nozzle 24 into engagement with the spring biased finger 46 to assist in holding the finger 46 against the orifice of the nozzle 34 with sufficient pressure to stop the flow of air from the orifice so that the pressure within the chamber in the block 30 builds up to the source pressure. The increase in the pressure in the chamber is transmitted through a conductor 68 to an air cylinder C, FIG. 1, to effect disengagement of the clutch which drives the rotating table. Alternatively, the pressure build up could be applied to operate an electric switch to stop the drive motor M.

In operation, as the containers travel along the track 14 from the rotating table 10 at a normal speed the air jet from the nozzle 24 is repeatedly interrupted as each container passes it but there is always a sufficient flow of air between containers so as to maintain the spring finger 54 displaced to the left as shown in FIG. 4. In this position the spring finger 46 is unaided by the biasing force provided by the spring finger 54 and so the flow of air from the nozzle 34 holds the spring finger 46 away and so long as the spring finger 46 is held away from the nozzle insufficient back pressure is transmitted through the conductor 68 to the cylinder C to effect its operation. If, for some reason, the line of containers travelling along the track 14 slows down or comes to a stop or a stalled position so that the jet from the nozzle 24 is blocked the spring finger 54 complements the biasing pressure of the spring finger 46 to close the orifice of the nozzle 34 so that the pressure within the chamber in the block 30 becomes sufficiently high to actuate the air cylinder C.

While the pressure means as thus described is illustrated in conjunction with a rotary table sorter it is to be understood that it can be used with any apparatus or equipment wherein articles are travelling along a confined passage and it is desirable to stop the delivery of articles to the passage automatically if the flow of articles slows down or is stalled to prevent overloading the apparatus and to enable a resumption of normal operation as soon as the flow resumes its normal rate.

It should be understood that the present disclosure is for the purpose of illustration only and includes all modifications or improvements which fall within the scope of the appended claims.

I claim:

1. In an apparatus for processing items, a passage through which items are moved in a continuous stream by jet propulsion produced by a jet disposed adjacent the passage so as to direct a jet of air across the passage at an angle to advance the items along the passage, means for delivering items to the passage, pressure responsive means operable at a predetermined pressure to effect operation of said last means to stop delivery, a metering device to which pressure is supplied at a predetermined pressure, means connecting the metering device to the pressure responsive means to effect its operation at said predetermined pressure, means for bleeding the pressure from said metering device so as to maintain the pressure in said metering device at a pressure lower than said predetermined pressure and means at the opposite side of the passage from the jet operable by intermittent exposure to the pressure from the jet so long as the stream flows constantly along said passage to allow the pressure to escape from said metering device and by the absence of pressure from the jet when the latter is blocked by a steady stream of items moving along the passage to prevent escape of pressure from said metering device.

2. In an apparatus for processing items, a passage through which items are moved in a continuous stream by jet propulsion produced by a jet disposed adjacent the passage so as to direct a jet of air across the passage at an angle to advance the items along the passage, means for delivering items to the passage, pressure responsive means operable at a predetermined pressure to effect operation of said last means to stop delivery, a chamber to which pressure is supplied at a predetermined pressure, said chamber containing an orifice through which pressure delivered to the chamber is permitted to escape, a spring biased closure supported adjacent the orifice for controlling the escape of pressure from the chamber such as to maintain a predetermined pressure in the chamber which is below that capable of effecting operation of the pressure responsive means and a part supported at the opposite side of the passage in a position to be operated on by the jet, said part being operable in the absence of pressure from the jet to cause the spring biased closure to overcome the force of the pressure escaping from the chamber so as to close the orifice, said part being disabled by exposure to the pressure from the jet.

3. In an apparatus for processing items a passage through which items are moved in a continuous stream by jet propulsion produced by a jet disposed adjacent the passage so as to direct a jet of air across the passage at an angle to advance the items along the passage, means for delivering items to the passage, pressure responsive means operable at a predetermined pressure to effect operation of the last means to stop delivery, means for supplying pressure to said pressure responsive means, comprising a chamber to which pressure is supplied at a predetermined pressure, said chamber containing an orifice through which pressure delivered to the chamber is permitted to escape, a part supported adjacent the orifice which is spring biased in the direction to control the escape of pressure from the orifice to maintain a predetermined pressure in the chamber which is lower than that required to effect operation of the pressure responsive means, a second part supported at the opposite side of the passage from the jet, said second part being spring biased toward the first part and being held displaced from the first part by impingement of the pressure from the jet so long as the items flow continuously along the passage and means movable by said second part when the latter is relieved of the pressure from the jet when the jet is blocked by a steady stream of items to supplement the spring biased first part to close the orifice.

4. Apparatus according to claim 3, wherein there is means for driving the means for supplying items to the passage including a clutch and the pressure responsive means is operable to disengage the clutch.

5. Apparatus according to claim 3, wherein there is means for driving the means for supplying items to the passage comprising a motor and the pressure responsive means is operable to stop the motor.

6. Apparatus according to claim 3, wherein the pressure responsive means is an air cylinder.

7. In an apparatus for processing items, a passage through which the items are moved in a continuous stream by jet propulsion produced by a jet disposed adjacent the passage so as to direct a jet of air across the passage at an angle to advance the items along the passage, means for delivering items to the passage, means operable at a predetermined pressure to effect operation of said last means to stop delivery, a chamber to which pressure is supplied at a predetermined pressure, means connecting the chamber to said pressure operable means, said chamber containing an orifice through which pressure delivered to the chamber is permitted to escape, a flexible spring biased part supported adjacent the orifice for controlling the escape of pressure from the chamber, said part permitting escape of pressure at a rate such that the pressure in the chamber is insufficient to effect operation of the pressure operable means, a second flexible spring biased part supported adjacent the first spring biased part biased in a direction to, in conjunction with the first part, press the first part into engagement with the orifice to close the latter, said second spring biased part including a portion situated in the part of the jet such as to be withheld by the force of the jet when the latter is permitted to impinge upon it so long as the items continue to flow along the passage and to be released by the absence of pressure from the jet when the items become stalled to cause the orifice to be closed.

8. Apparatus according to claim 7, comprising means for adjusting position of said second part relative to said first part.

9. In an apparatus for processing items, a sorting table to which items are delivered for orientation, a discharge passage to which oriented items are delivered from said sorting table, means comprising a jet arranged adjacent the passage for directing a jet of air across the passage at an angle to advance the items delivered to the passage along the passage, pressure responsive means operable at a predetermined pressure to effect operation of said last means to stop delivery of items from the table, means for supplying pressure to said pressure responsive means at said predetermined pressure and means located at the opposite side of the passage to the jet operable by intermittent exposure to the pressure jet so long as the items flow continuously along said discharge passage to maintain the pressure to said pressure responsive means below said predetermined pressure and by the absence of pressure from the jet when the latter is blocked by a steady stream of items to deliver pressure to said pressure responsive means at said predetermined pressure.

10. Apparatus according to claim 9, wherein there is a motor and clutch means for driving the sorting table and the pressure responsive means is operated to disengage said clutch.

11. In an apparatus for processing items, a passage through which items are adapted to be moved in a continuous stream, means for delivering items to the passage, a nozzle supported adjacent one side of the passage for directing a jet of air across the passage at an angle to advance the items along the passage, means for supplying air pressure to the nozzle such that the nozzle projects a jet stream across the passage, control means including pressure responsive means operable at a predetermined pressure to stop said first means and an actuator supported at the other side of the passage in alignment with the nozzle in the jet stream operable by unimpeded pressure of the jet stream for more than a predetermined length of time to supply pressure at said predetermined pressure to said pressure responsive means, but when subjected to said jet pressure at intervals less than said predetermined time to reduce said pressure to less than said predetermined pressure.

12. In an apparatus for processing items, a passage through which items are adapted to be moved in a continuous stream, means for delivering items to the passage, means adjacent one side of the passage for directing a jet of air across the passage at an angle to advance items along the passage, pressure responsive means operable at a predetermined pressure to effect operation of said first means to stop delivery, means for supplying pressure to said pressure responsive means at said predetermined pressure and means located at the other side of the passage in alignment with the jet from the nozzle operable by intermittent exposure to the pressure of the jet so long as the items flow continuously along said passage to maintain the pressure to said pressure responsive means below said predetermined pressure and by the absence of pressure from the jet when the latter is blocked by a standing stream of items to deliver pressure to said pressure responsive means at said predetermined pressure.

13. In an apparatus for processing items, a passage along which items are moved in a continuous stream by jet propulsion produced by a jet disposed adjacent to one side of the passage so as to direct a jet of air across the passage at an angle to advance items along the passage, means for delivering items to said passage, control means for stopping and starting said means, said control means including pressure-responsive means operable when the jet stream is prevented from crossing the passage by a standing line of items in the passage to effect operation of the control means to stop delivery and means for maintaining the pressure supplied to said pressure-responsive means at a lower than operating pressure so long as the items continue to flow freely along said passage.

* * * * *